3,393,139
METHOD FOR PREPARING CYCLOALKANON-
OXIMES BY SUBJECTING CYCLOALKANES TO
PHOTONITROSO REACTION
Shigeru Wakamatsu, Midori-ku, Nagoya, Yoichi Shimo-
kawa, Ichiba-Higashi, and Fumio Nishikawa, Shijyo-
machi, Japan, assignors to Toyo Rayon Kabushiki Kai-
sha, Tokyo, Japan, a corporation of Japan
No Drawing. Filed Aug. 3, 1964, Ser. No. 387,176
Claims priority, application Japan, Aug. 2, 1963,
38/40,318
3 Claims. (Cl. 204—162)

ABSTRACT OF THE DISCLOSURE

A method for the manufacture of cycloalkanonoximes by subjecting cycloalkanes and nitroso agents to the irradiation of light, said method being carried out by applying layers of water-repellent substance which does not react substantially with the reactants at at least that portion of the outermost wall permitting the passage of light from the source which is exposed to the reaction solution, said water-repellent substance being selected from the group consisting of fluoric resins and silicone resins.

---

In the known method of subjecting cycloalkanes to photonitroso reaction to manufacture the corresponding cycloalkanonoxime hydrochlorides, the present invention relates to a process which favourably prevents the formation of colored tarry filmy by-products deposited on the outer wall of the light source element which is exposed to the reaction solution, thereby improves the utilization of light and obtains the desired cycloalkanonoxime hydrochlorides constantly for a long period with high purity and yield. More particularly, the present invention relates to a process for subjecting cycloalkanes to photonitroso reaction which, in reacting cycloalkanes with nitroso agents under the irradiation of light to manufacture cycloalkanonoxime hydrochlorides, is characterized by conducting the photonitroso reaction by providing layers of a water-repellant substance which does not substantially react with reactants, at least on that portion of the outer wall of the light source permitting the passage of light therefrom which is exposed to the reaction solution.

Various methods are known in connection with the photonitroso reaction of cycloalkanes: for example, a method which comprises immersing the light source in the reaction solution or placing said source outside a reaction vessel and charging nitroso agents in a gaseous form into the reactor while irradiating effective light for reaction through the wall which well permits the passage of light; a method which consists in conducting the reaction solution containing a nitroso agent down along the wall where the light from a light source is brought in contact with the reaction solution; and a method which comprises introducing the gaseous form of the nitroso agent along said wall and conducting a reaction solution in counter current.

Where a photonitroso reaction is performed by those known methods, light yellow or reddish brown tarry film is produced with the progress of reaction on that portion of the outer wall of the light source permitting the passage of light therefrom which is exposed to the reaction solution, gradually interrupting the passage of effective light for reaction. This not only causes the loss of useful light for reaction, but also prevents the constant progress of reaction. In addition, due to the development of unfavorable side reactions, the production rate of the desired oxime decreases with the passage of time, and the purity and yield are reduced accordingly.

The foregoing difficulties encountered in a photonitroso reaction of cycloalkanes constitute considerable technical bottlenecks in carrying out said reaction on an industrial scale. Hitherto various proposals have been advanced to overcome these technical problems. The present invention is also intended for the same purpose, and, more particularly, relates to a process which can eliminate the foregoing technical hindrances very easily.

Thus, an object of the present invention is to provide a means whereby the formation of the aforementioned colored tarry film is avoided and the above industrial problems can be resolved quite simply.

Included among the methods which have previously been proposed for avoidance or removal of the colored tarry film formation are a method (United States Patent No. 2,719,116) which comprises adding to a reaction solution carboxylic acid with 1 to 4 carbon atoms and chlorine—and fluorine—derivatives thereof; a method (Japanese Patent Publication No. 11,183 (1960); this is the same as the German Patent No. 1,070,172, the British Patent No. 846,840 and the United States Patent No. 2,-985,572) which consists in carrying out the photonitroso reaction of cycloalkanes by previously adding to a reaction solution a mixture of by-products occurring in said reaction; a method (United States Patent No. 3,090,-739) which comprises conducting streams of sulfuric acid downward along that portion of the light source outer wall which is exposed to the reaction solution; and a method which is characterized by adding an adequate solvent to the reaction solution and reducing the viscosity of the oily substance produced by the reaction (the photonitroso reaction of cycloalkanes usually produces cycloalkanonoxime hydrochlorides in an oily state) to restrict the deposition of said oily substance on the outermost wall through which the light passes. All these methods aim at the prevention or removal of the foregoing film formation by a chemical process. There are also some other proposals including a method which conducts the reaction by eliminating from the source light particularly those light wave lengths which are associated with the formation of side reaction products and a method which involves a physical device whereby the tarry film produced undergoes a physical scraping off action caused by the movement of solids, gases or liquids. However, if a much simpler process is developed which is considerably effective in preventing or removing the formation of the aforementioned tarry film it will bring great industrial benefit from the standpoint of operation and equipment.

The inventors have studied from a completely different point of view from those underlying the foregoing proposals in an attempt to provide a simple method for restricting the formation of colored tarry film. As a prerequisite for this, the inventors have closely studied the mechanism whereby the colored tarry film is formed. As a result they have discovered that the first deposit on that part of the light-penetrating section which is exposed to the reaction solution mainly consists of oily oxime hydrochlorides, the major reaction product, and that further reacting with nitroso agents including nitrosyl chloride, the deposit gradually turns into light yellow or reddish brown tarry film which is no longer readily removable. From this observation, they have also learned that a most effective means to stop the formation of colored tarry film is either to prevent oily cycloalkanonoxime hydrochlorides from attaching itself to that portion of the light-penetrating section which comes in contact with the reaction solution or to prevent said hydrochlorides from turning into a hardly removable colored tarry state so that it can be easily separated even after it has once been deposited.

From the foregoing observations, the inventors have found that if that portion of the light-penetrating outer wall which is exposed to the reaction solution is made of water repellent substance it will be very effective to prevent the deposit of oily cycloalkanonoxime hydrochlorides from turning into colored tarry film. Thus they have accomplished the present invention.

The outermost wall through which the light from the source passes usually consists of glass tubes or sheets, because glass has a large light penetration index. However, glass has so great affinity with oily oxime hydrochlorides that it tends to be wetted by the latter, thus causing its ready deposition. In contrast, a water repellent substance, for example, fluoric resin or Teflon, is extremely non-affinitive with the oily oxime hydrochlorides and has a nature to repel it. Consequently it is more difficult for the oily oxime hydrochlorides to attach itself to the water repellent substance than to the glass.

With the process of the present invention, it is possible to stop almost completely the formation of colored tarry film. This not only considerably improves the utilization of light supplied and appreciably increases the yield of oxime per unit light volume and consequently unit power consumption, but also makes it possible to continue a stable photonitroso reaction of cycloalkanes with increased purity of the oxime obtained.

As the water repellent substance used in the process of the present invention should be selected such material as will not substantially react with the reactants. As clearly seen from the foregoing explanation, preferable water repellent substances for the present invention should be such that they are more repellent to the oily oxime hydrochlorides as compared at least with the glass; namely they should more strongly prevent the deposition of the hydrochlorides. Also they should not substantially react with nitroso agents including nitrosyl chloride in the presence of light, but allow effective light for reaction to penetrate as thoroughly as possible.

Some concrete examples of the aforesaid water repellent substances include silicon resins such as methylhydrogen-polysiloxane and dimethyl-polysiloxane in addition to fluoric resins, for example, polytetrafluoroethylene, polytrifluorochloroethylene and tetrafluoroethylene-hexafluoropropylene copolymer.

In the process of the present invention, the application of the water repellent substance on that portion of the light penetrating outermost wall which is exposed to the reaction solution may be made by various means, for example, by constructing said outermost wall with the water repellent substance itself, or covering with water repellent film that part of the outermost wall which is exposed to the reaction solution, or coating said water repellent substance thereon. While a water repellent layer may be varied in thickness, the thickness of about 0.02 to 3.0 mm. usually serves the purpose.

The known method of photonitroso reaction of cycloalkanes is applicable to the process of the present invention, except that at least that portion of the outer wall of the light source permitting the passage of light therefrom which comes in contact with a reaction solution consists of water repellent layers and that said photonitroso reaction is conducted under such conditions.

As used in the process of the present invention, the cycloalkanes may include those containing 5 to 14 carbon atoms such as cyclopentane, cyclohexane, cyclooctane and cyclododecane, and the nitroso agents may consist of the known kinds, for example, nitrosyl chloride, mixed gas of chlorine and nitrogen monoxide and mixed gas of nitroso gas nitrogen monoxide, nitrogen dioxide and hydrogen chloride. The subject reaction can be conducted with advantage by concurrently introducing into the reaction system excess amounts of hydrogen chloride, or chlorine as the case may be. Also applicable to the process of the present invention is the method which comprises adding to the aforesaid cycloalkanes solvents inert to the reaction system, and also the method which involves incorporation of light sensitizer.

The present invention will be more clearly understood with reference to the examples which follow.

EXAMPLE 1

800 g. of cyclohexane were charged into a cylindrical glass reaction vessel 8.0 cm. in inner diameter and 25 cm. in height which was provided with a discharge stopper at the bottom. On the other hand, a 270 w. bar-like high pressure mercury lamp was inserted into a glass tube open at one end and provided with a cooling jacket. With the outermost wall of this glass tube covered with a film (0.025 mm. thick) consisting of tetrafluoroethylene-hexafluoropropylene copolymer, the mercury lamp was immersed in the aforesaid reaction vessel. With the lamp lighted and the temperature of the reaction solution maintained at 10 to 15° C., a mixed gas of nitrosyl chloride and hydrogen chloride was introduced into the lower part of the reaction solution at the rate of 160 cc./min. for the former and 640 cc./min. for the latter. The reaction solution turned from colorless to light yellow, and about 15 min. later a light yellow oily substance began to separate and collect at the discharge stopper at the bottom of the reaction vessel. After 4 hrs. reaction under such conditions, 165.4 g. of oily cyclohexanonoxime hydrochloride were obtained. The product was dissolved in small amounts of water and neutralized to pH of 6.0 with 20% aqueous solution of caustic soda. Then 92.9 g. of cyclohexanonoxime were obtained with a melting point of 87 to 88° C. Even after completion of the reaction, no colored tarry film formation was observed on the surface (covered with a film consisting of tetrafluoroethylene-hexafluoropropylene copolymer) of the light penetrating section exposed to the reaction solution.

By way of comparison, the same reaction apparatus was used and reaction was conducted quite in the same way as in the above case, excepting that the surface of the light penetrating section exposed to the reaction solution was not covered with the aforesaid copolymer film. The oily cyclohexanonoxime hydrochloride obtained amounted to 107.0 g., and the cyclohexanonoxime obtained by the same treatment as before was only 61.1 g. Moreover, the surface (glass wall) of the light penetrating section was covered all over with reddish brown tarry film formation.

EXAMPLE 2

Reaction was conducted wtih the same reaction equipment and in the same way as in Example 1. In this case comparison was made of the following three cases:

(a) Polytetrafluoroethylene was coated to a thickness of 0.1 mm. on that surface of the outermost wall permitting the passage of light from the source which is exposed to the reaction solution.

(b) Polytrifluorochloroethylene was coated to the same thickness on the aforesaid surface.

(c) The glass tube was directly used in the reaction without any treatment.

The results are shown in the followng Table 1.

TABLE 1

| | Cyclohexanonoxime Yield (g.) | | |
|---|---|---|---|
| | Coated with Polytetrafluoro-ethylene (a) | Coated with Polytrifluoro-chloroethylene (b) | With no coating (c) |
| Up to 1 hr. after start of reaction | 14.5 | 14.5 | 16.5 |
| From 1 hr. to 2 hrs | 22.8 | 23.6 | 16.7 |
| From 2 hrs. to 3 hrs | 22.0 | 23.7 | 15.9 |
| From 3 hrs. to 4 hrs | 21.8 | 22.8 | 13.8 |
| From 4 hrs. to 5 hrs | 22.1 | 23.0 | 13.1 |
| From 5 hrs. to 6 hrs | 21.5 | 22.7 | 12.6 |
| From 6 hrs. to 7 hrs | 21.8 | 22.5 | 11.7 |
| From 7 hrs. to 8 hrs | 21.6 | 22.9 | 11.0 |
| From 8 hrs. to 9 hrs | 21.9 | 22.3 | 10.3 |
| From 9 hrs. to 10 hrs | 21.7 | 22.8 | 9.7 |
| Total | 211.7 | 220.8 | 131.3 |

As seen from the above Table 1, in the cases of (a) and (b) using the process of the present invention no colored tarry film formation was observed, and the reaction proceeded constantly without any decrease in the oxime output, whereas in the case of (c) reddish brown tarry film formation appeared prominently, and the oxime output slowed down with time, until the total yield after 10 hours indicated a sharp decline.

EXAMPLE 3

The same reaction vessel as in Example 1 was charged with 850 g. of cyclooctane. The outermost wall permitting the passage of light from the source was composed of a tube produced from polytrifluorochloroethylene (about 1 mm. thick) instead of a glass tube. In all other respects reaction was conducted quite in the same way as in Example 1. After 4 hrs. reaction, 225.0 g. of oily cyclooctanonoxime hydrochloride were obtained. With the mass treated in the same way, 136.0 g. of cyclooctanonoxime were obtaned with a melting point of 36 to 37° C. Even after completion of the reaction, no colored tarry film formation was observed on the surface of the light penetrating section exposed to the reaction liquid.

By way of comparison, reaction was conducted, using a glass tube as the outermost wall permitting the passage of light. After 4 hrs. reaction only 90.3 g. of cyclooctanonoxime were obtained, and moreover the light penetrating section was covered all over with brown tarry film formation.

EXAMPLE 4

The same reaction apparatus as in Example 1 was charged with a mixed solution consisting of 275 g. of cyclododecane and 550 g. of cyclohexane and a photonitroso reaction was conducted in the same way.

In this case, that portion (glass tube) of the outermost wall permitting the passage of light from the source which was exposed to the reaction solution was covered with a film (0.03 mm. thick) consisting of tetrafluoroethylene-hexafluoropropylene copolymer. After 4 hrs. reaction under such conditions, 180.1 g. of oily cycloalkanonoxime hydrochlorides were obtained. The mass was diluted with about 600 cc. of water. White crystals then settling out were filtered and 51.8 g. of cyclododecanonoxime were obtained with a melting point of 133 to 134° C. On the other hand, the filtrate was neutralized to pH of 6.0 with 20% caustic soda solution, and 61.0 g. of cyclohexanonoxime were obtained with a melting point of 88 to 89° C. Even after completion of the reaction, no colored tarry film formation was observed.

By way of comparison, a glass tube was directly used in the reaction without treating the light penetrating section. The output of oily cycloalkanonoxime hydrochlorides after 4 hrs. reaction was reduced to 120.8 g. With the mass treated in the same way as the above mentioned, 34.1 g. of cyclododecanonoxime and 40.9 g. of cyclohexanonoxime were obtained. In this case reddish brown tarry film formation developed prominently on the outer wall of the light penetrating section exposed to the reaction solution.

EXAMPLE 5

The same reaction apparatus as in Example 1 was used. That portion of the outermost wall permitting the passage of light from the source which was exposed to the reaction solution was coated with various kinds of silicon resin in accordance with the conventional procedure. Then the photonitroso reaction of cyclohexane was conducted by the same method and under the same conditions as in Example 1.

Where the glass tube was directly used in the reaction without any such coating, the surface (glass tube wall) of the light penetrating section was covered all over, as the reaction progressed, with reddish brown tarry film formation. As a result, the oxime output gradually dropped. In contrast where the coating of silicon resin was applied, no colored tarry film formation was observed. The oxime output per unit time was improved, and said output showed no tendency to decrease, even though reaction was continued for long.

The following Table 2 presents the reaction results obtained when the aforesaid silicon resin coating was applied as compared with those obtained when a glass tube was directly used.

TABLE 2

| | Cyclohexanonoxime Yield (g.) | | |
|---|---|---|---|
| | Coated with Toshiba Silicon TS 903 B | Coated with Shinetsu Silicon KC 88 | With no coating |
| Up to 1 hr. after start of reaction | 15.8 | 16.1 | 16.0 |
| From 1 hr. to 2 hrs | 22.7 | 23.0 | 16.8 |
| From 2 hrs. to 3 hrs | 23.8 | 23.4 | 15.9 |
| From 3 hrs. to 4 hrs | 23.5 | 22.9 | 14.0 |
| From 4 hrs. to 5 hrs | 22.8 | 23.5 | 13.2 |
| From 5 hrs. to 6 hrs | 23.6 | 23.2 | 12.5 |
| From 6 hrs. to 7 hrs | 23.3 | 23.6 | 11.6 |
| From 7 hrs. to 8 hrs | 23.4 | 22.7 | 11.0 |
| From 8 hrs. to 9 hrs | 22.9 | 23.3 | 10.6 |
| From 9 hrs. to 10 hrs | 23.5 | 23.4 | 10.0 |
| Total | 225.3 | 225.0 | 131.6 |

EXAMPLE 6

The photonitroso reaction of cyclooctane was conducted in the same way as in Example 3 except that the portion of the outermost wall permitting the passage of light from the source which was exposed to the reaction solution was coated with Toshiba Silicon TS 900 (trade name) in accordance with the conventional procedure. After 4 hrs. reaction, 220.5 g. of oily cyclooctanonoxime hydrochloride were obtained. With the mass treated in the same way as in Example 3, 133.7 g. of cyclooctanonoxime were obtained with a melting point of 36 to 37° C. Even after completion of the reaction, no colored tarry film formation was observed on the surface of the light penetrating section exposed to the reaction solution.

In contrast where the glass tube was directly used without any such coating, only 89.6 g. of cyclooctanonoxime were obtained after 4 hrs. reaction, and moreover the light penetrating section was covered all over with brown tarry film formation.

Having described the specification, we claim:

1. Method for subjecting cycloalkanes to photonitroso reaction which, in the manufacture of cycloalkanonoxime by subjecting cycloalkanes and nitroso agents to photonitroso reaction under the irradiation of light, is characterized by conducting said reaction by applying layers of a water repellent substance selected from the group consisting of fluoric and silicone resins which does not substantially react with the reactants at least on that portion of the outermost wall permitting he passage of light from the source which is exposed to the reaction solution.

2. Method as described in claim 1 wherein said fluoric resins are selected from the group consisting of polytetrafluoroethylene, polytrifluorochloroethylene and tetrafluoroethylene-hexafluoropropylene copolymer.

3. Method as described in claim 1 wherein said silicone resins are selected from the group consisting of methyl hydrogen-polysiloxane and dimethyl-polysiloxane.

References Cited
UNITED STATES PATENTS

| | | | |
|---|---|---|---|
| 2,719,116 | 9/1955 | Brown | 204—162 |
| 3,141,839 | 7/1964 | Metzger et al. | 204—162 |

HOWARD S. WILLIAMS, *Primary Examiner.*